(12) United States Patent
Kata et al.

(10) Patent No.: US 6,949,213 B1
(45) Date of Patent: Sep. 27, 2005

(54) VULCANIZING MOLD FOR PNEUMATIC TIRES

(75) Inventors: Takehiro Kata, Kodaira (JP); Masaru Miura, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 400 days.

(21) Appl. No.: 09/431,154

(22) Filed: Nov. 1, 1999

(30) Foreign Application Priority Data

Nov. 2, 1998 (JP) .................................. 10-311605

(51) Int. Cl.[7] ............................................ B29C 35/02
(52) U.S. Cl. ........................................ 264/326; 425/46
(58) Field of Search .......................... 425/46; 264/501, 264/326

(56) References Cited

U.S. PATENT DOCUMENTS

| | | | | |
|---|---|---|---|---|
| 3,553,789 A | * | 1/1971 | Allitt ............................ | 425/36 |
| 3,806,288 A | * | 4/1974 | Materick ...................... | 425/46 |
| 3,990,823 A | * | 11/1976 | Le Moullac .................. | 425/46 |
| 4,289,463 A | * | 9/1981 | Le Moullac .................. | 425/46 |
| 5,208,044 A | | 5/1993 | Miyata et al. ................ | 425/32 |
| 6,066,283 A | * | 5/2000 | Nara et al. .................... | 425/46 |

FOREIGN PATENT DOCUMENTS

| | | | | |
|---|---|---|---|---|
| GB | 1 248 891 | | 10/1971 | |
| SU | 325190 | * | 3/1971 | ................. 425/46 |

* cited by examiner

*Primary Examiner*—James P. Mackey
(74) *Attorney, Agent, or Firm*—Oliff & Berridge, PLC

(57) ABSTRACT

A vulcanizing mold for pneumatic tires includes upper and lower base plates, upper and lower sidewall mold members attached to the upper and lower base plates, respectively; and upper and lower tread mold members attached to the upper and lower base plates, respectively. The upper and lower tread mold members are constituted of upper segments and lower segments, respectively. The upper and lower segments can be radially expanded and contracted relative to the upper and lower sidewall mold members, respectively. In operation, the upper and lower sidewall mold members are displaced toward each other so that the upper and lower segments are brought into abutment with each other. Then, a single cam ring is operated to cause all of the segments to be simultaneously displaced radially inwards and relative to the upper and lower sidewall mold members, with the upper segments in abutment with the lower segments.

5 Claims, 4 Drawing Sheets

VULCANIZING MOLD FOR PNEUMATIC TIRES

BACKGROUND OF THE INVENTION

1. Field of the Invention

The present invention relates to a vulcanizing mold and vulcanizing method for pneumatic tires.

2. Description of the Related Art

Conventional vulcanizing molds for pneumatic tires are typically classified into two types, i.e., a full-type mold and a split-type mold. A full-type mold has inner surface portions for forming the tread portion and side portions of a tire, and is divided into upper and lower mold halves at a parting plane which corresponds to the tire equatorial plane. These mold halves are displaceable in the vertical direction toward and away from each other for closing and opening the mold, respectively.

The full-type mold is advantageous in that it is simple in structure, small in size and inexpensive. However, upon removal of a product tire out of the mold after completion of vulcanization, the mold is opened only by a relative vertical displacement of the upper and lower mold halves, and the full-type mold may thereby give rise to formation of defective products depending upon the tread pattern. More particularly, during the relative vertical displacement of the mold halves, the projections or ridges provided on the mold inner surface for forming the tread portion of the tire may exert excessive shearing forces to the tread land regions, thereby causing such problem that defects tend to be formed in the tread land regions such as nicks and/or cracks.

On the other hand, a split-type mold is comprised of upper and lower sidewall mold members which are vertically displaceable relative to each other, and a tread mold member which is divided into a plurality of arcuate segments arranged successively in the circumferential direction. The segments of the tread mold member are radially displaceable to increase or decrease the diameter.

In such a split-type mold, as shown in FIG. 1, in order to remove the product tire T out of the mold after completion of vulcanization, it is necessary to displace the respective segments C radially outward so as to increase the diameter. On this occasion, the abutment surface b of the segment C has to be displaced from the corresponding abutment surfaces of the upper and lower sidewall mold members SU and SL at least by an amount d, in order to positively disengage the tread land region of the tire T from the projections or ridges on the inner surface of each segment and avoid interference therebetween, for preventing formations of defects in the tread land region such as nicks and/or cracks. It is further necessary to subsequently displace the segments in predetermined directions, typically vertically upwards, to respective positions where they do not hinder the removal of the tire T from the mold. As such, it is inevitable that the split-type mold as a whole is large in its outer diameter. This is particularly the case where tires having a large aspect ratio are to be produced, such as off-road tires and motorcycle tire, because the size of the mold, hence the size of vulcanizing machine, must be large with reference to the tire size, thereby resulting in increased cost for the entire facility.

SUMMARY OF THE INVENTION

It is therefore a primary object of the present invention to eliminate the above-mentioned problems of the prior art.

It is a more specific object of the present invention to provide improved vulcanizing method and mold therefor, which effectively prevent formation of defects in the tread land regions of tires when the mold is opened.

It is a further object of the present invention to provide improved vulcanizing method and mold therefor, which sufficiently reduce the radial displacement amount of the segments to thereby minimize the size of the mold and avoid increase in cost of the facility.

According to one aspect of the present invention, to achieve the above objects, there is provided a vulcanizing mold for pneumatic tires, comprising: upper and lower base plates; upper and lower sidewall mold members for forming tire sidewall portions, said upper and lower sidewall mold members being attached to said upper and lower base plates, respectively; upper and lower tread mold members for forming a tire tread portion, said upper and lower tread mold members being attached to said upper and lower base plates, respectively; said upper and lower tread mold members being constituted of upper segments and lower segments, respectively, said upper and lower segments being displaceable only radially relative to said upper and lower sidewall mold members, respectively; and a single cam ring which is adapted to be displaced independently of approaching displacements of said sidewall mold members toward each other, to thereby simultaneously displace all of said upper and lower segments radially inwards while said upper and lower segments are in abutment with each other.

In this way, according to the present invention, the upper and lower tread mold members forming a pair are constituted of the upper segments and lower segments, respectively, which can be radially displaced to decrease or increase the diameter. When the mold is opened to remove the product tire from the mold, all of the segments are displaced radially outwards to increase the diameter by virtue of the operation of the cam ring. Thus, it is possible to smoothly disengage the projections and/or ridges on the inner surfaces of the segments from the recesses or grooves in the tread of the tire. The mold is then opened by vertically displacing the upper and lower tread mold members away from each other, for allowing removal of the tire from the mold. On such occasion, because the recesses or grooves in the tread of the tire have already been disengaged from the projections and/or ridges on the inner surfaces of the segments, the tire can be positively removed from the mold without forming defects in the tread land region such as nicks and/or cracks.

Furthermore, when the mold is opened from the position in which the upper and lower tread mold members are in abutment with each other, it is unnecessary to displace the upper and lower tread mold members as an integral assembly toward the upper side over a large distance. Thus, as compared to the prior art, the present invention serves to minimize the required displacement amount of the respective segments radially outwards, within such a degree that the maximum projections or ridges on the inner surface of the segments can be fully disengaged from the recesses in the tread. It is therefore possible to effectively avoid undesirable increase in the outer diameter of the mold as a whole.

Preferably, in the vulcanizing mold of the present invention, the upper and lower segments are engaged with the upper and lower base plates, respectively, such that they are radially displaceable relative to respective one of the sidewall mold members, either directly or indirectly through slide guide members which may be provided on the sidewall mold members. In this way, it is possible to always achieve a smooth radial displacement of the segments relative to the respective sidewall mold members, and to positively prevent undesired withdrawal of the segments vertically upwards or downwards.

Preferably, the cam ring is engageable with both of the upper and lower segments of the upper and lower base plates sides. In this way, it is possible to positively achieve the required radial displacement of the respective segments by the operation of the cam ring, to ensure that such displacement is guaranteed without specific actuators or biasing springs for exerting biasing force radially outwards, and to prevent unintended expansion or contraction of the mold due to the engagement of the segments with the cam ring.

However, insofar as the lower segments of the lower tread mold member are concerned, which are disengaged from the cam ring when opening the mold, it is also possible to urge them radially outwards by means of actuators or biasing spring, to thereby hold the segments in their diameter expanding posture.

Preferably, the upper segments are always in engagement with the cam ring on radially inner side thereof. In this instance, the cam ring has an initial posture in which it is in contact with the upper segments along the entire height thereof. Thus, upon closing the mold, it is possible to minimize the downward stroke of the cam ring required for fully displacing the upper and lower segments radially inwards. As a result, it is possible to advantageously reduce the vertical dimension of the mold, and the mold closing process can be completed within a short period of time.

More preferably, there are provided abutment members for defining the upper limit position of the cam ring relative to the upper base plate. In this way, the engagement of the cam ring with the upper segments of the upper base plate side can be assured, and the subsequent mold opening operation can be continued by an upward driving force applied to the cam ring.

According to another aspect of the present invention, there is provided a vulcanizing method for pneumatic tires with a vulcanizing mold which comprises: (i) upper and lower base plates; (ii) upper and lower sidewall mold members attached to said upper and lower base plates, respectively; and (iii) upper and lower tread mold members attached to said upper and lower base plates, respectively; (iv) said upper and lower tread mold members being constituted of upper segments and lower segments, respectively, which can be radially expanded and contracted relative to the upper and lower sidewall mold members, respectively. In the method according to the present invention, the upper and lower sidewall mold members are displaced toward each other so that the upper and lower segments are brought into abutment with each other. Then, a single cam ring is operated to simultaneously displace all of the segments radially inwards and relative to the upper and lower sidewall mold members, with the upper segments in abutment with the lower segments in order to perform the required pattern formation on the tread portion of a green tire.

In the method according to the present invention, the formation at the side portions of a green tire is performed before the formation at the tread portion of the green tire, by means of the sidewall mold members have forming inner surfaces which are substantially free from unevenness. It is thus possible to significantly reduce the flow of the rubber material due to the formation, effectively preventing the flow of the rubber material into a space, if any, between the sidewall mold members and the segments on their radially outer sides. As a result, it is possible to advantageously prevent the rubber material from biting between the sidewall mold members and the segments which are being displaced radially inwards, for performing subsequent formation at the tread portion of the green tire.

DETAILED DESCRIPTION OF THE PREFERRED EMBODIMENT

The present invention will be further described hereinafter with reference to a preferred embodiment shown in the accompanying drawings.

Figure 1:
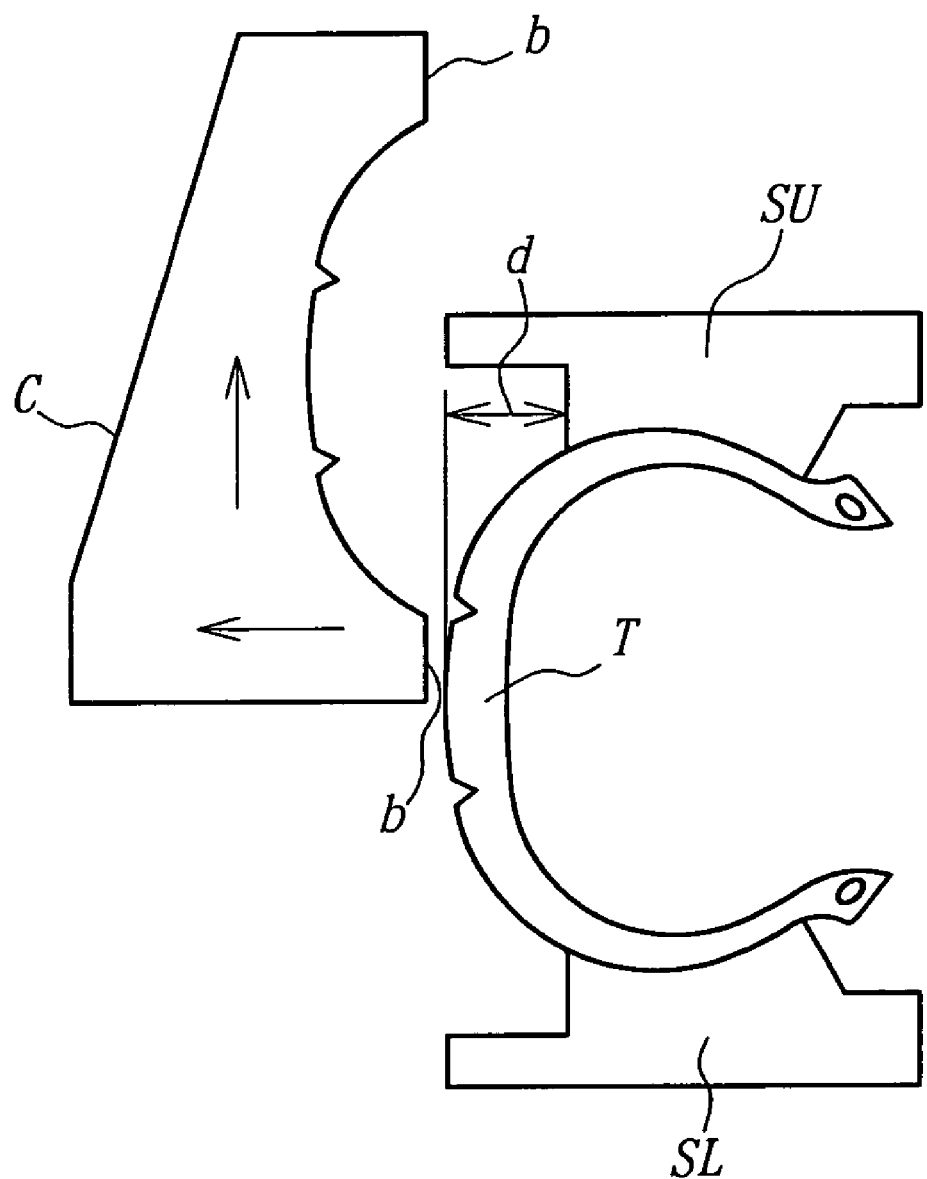
FIG. 1 is a schematic sectional view showing the vulcanizing mold according to the above-mentioned prior art.
Figure 2:
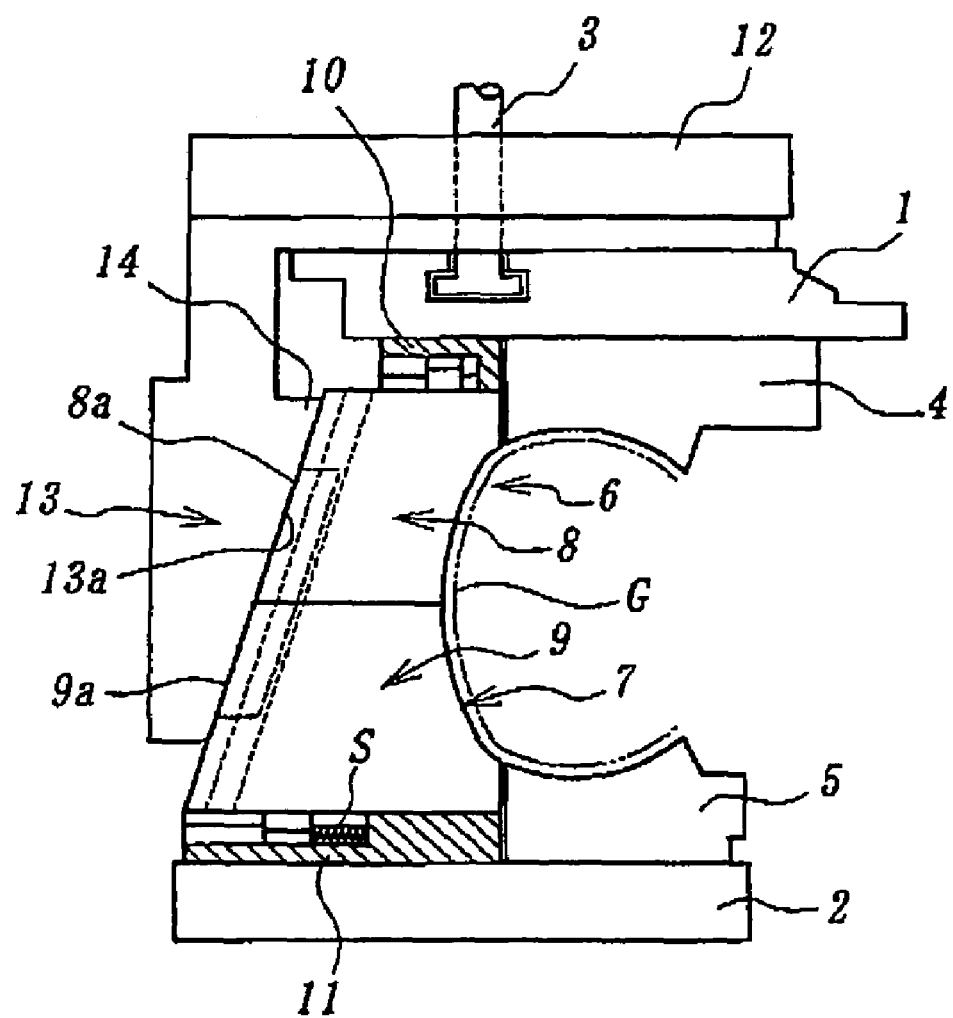
FIG. 2 is a schematic sectional view showing the vulcanizing mold according to one embodiment of the present invention.

FIG. 2 is a longitudinal sectional view of an essential part of an embodiment of the present invention, wherein reference numerals 1 and 2 designate upper base plate and lower base plate, respectively. Here, the upper base plate 1 can be displaced vertically upwards and downwards relative to the lower base plate 2 also acting as a lower platen, under the operation of a cylinder rod 3 of a cylinder device (not shown).

Upper and lower sidewall mold members 4, 5 which contribute to the formation of the outer surfaces of tire sidewall portions are provided by directly fixing them to the upper and lower base plates 1, 2, respectively. There are also provided upper and lower tread mold members 6, 7 which contribute to the formation of the tire tread surface, on the outer peripheral sides of the sidewall mold members 4, 5, respectively. Here, the upper and lower tread mold members 6, 7 are constituted of a plurality of segments 8, 9 which can be radially displaced relative to the sidewall mold members 4, 5.

The radial displacement of the segments 8, 9 can be smoothly and assuredly performed, by engaging the upper end portions and lower end portions of the segments 8, 9 into T-shaped grooves in slide guide brackets 10, 11 which are attached to the upper and lower base plates 1, 2, respectively. The T-shaped grooves are formed to extend radially relative to the sidewall mold members 4, 5, and serve to guide the radial sliding displacement of the segments 8, 9 and also to prevent withdrawal of the segments 8, 9 from the slide guide brackets 10, 11. In this way, the upper and lower segments 8, 9 are allowed to be displaced only radially, relative to the respective sidewall mold members 4, 5.

Instead of attaching the slide guide brackets 10, 11 to the respective base plates 1, 2 independently of the sidewall mold members 4, 5, it is possible to provide slide guides of a similar structure as the slide guide brackets 10, 11, on extended portions of the respective sidewall mold members 4, 5. Also in this way, the segments 8, 9 can be radially displaced in a desired smooth manner.

In either case, the segments 8, 9 can be radially displaced to predetermined positions where the forming surfaces of the segments 8, 9 are aligned with the corresponding forming surfaces of the sidewall mold members 4, 5, respectively, without any gaps therebetween.

Furthermore, at a position above the upper base plate 1, a cam ring 13 is attached to an upper platen 12 which is adapted to be displaced vertically upwards and downwards with a driving means independent from that for the upper base plate 1. The cam ring 13 has an inner peripheral surface which projects toward the segments 8, 9 and contacts them. Such inner surface of the cam ring 13 forms a tapered cam surface 13a having an inner diameter which progressively increases downwards. On the other hand, the outer peripheral surfaces of the segments 8, 9 are provided with driven surfaces 8a, 9a having tapered angles corresponding to the tapered cam surface 13a. These driven surfaces 8a, 9a are capable of achieving a surface contact with the tapered cam surface 13a.

In this way, the respective segments 8, 9 can be displaced radially inwards, based on the downward displacement of the cam ring 13, hence, the downward displacement of the tapered cam surface 13a.

Figure 3:
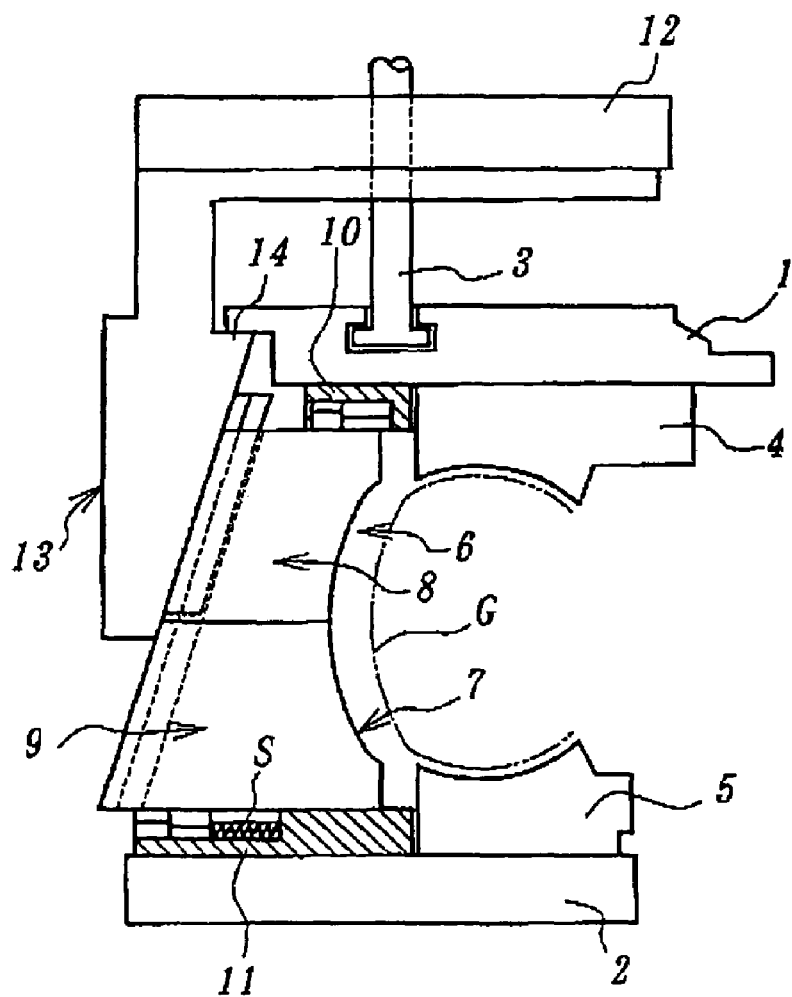
FIG. 3 is a schematic sectional view showing the vulcanizing mold of FIG. 2, wherein the segments have been radially expanded to the respective outermost positions.

Meanwhile, as shown in FIG. 3, when the cam ring 13 is in contact with the upper segments 8 from the outer side and over the entire height of the upper segments 8 which has been displaced radially outwards, it is possible to positively define the outer limit position of the segments 8 by the cam ring 13. It is also possible to displace the segments 8, 9 from their outer limit positions toward the inner limit positions, respectively, even with a minimized amount of the downward stroke of the cam ring 13.

Figure 4:
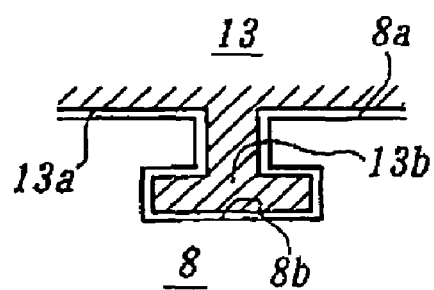
FIG. 4 is a fragmentary sectional view showing the connection between the cam ring and the segment.
Figure 5:
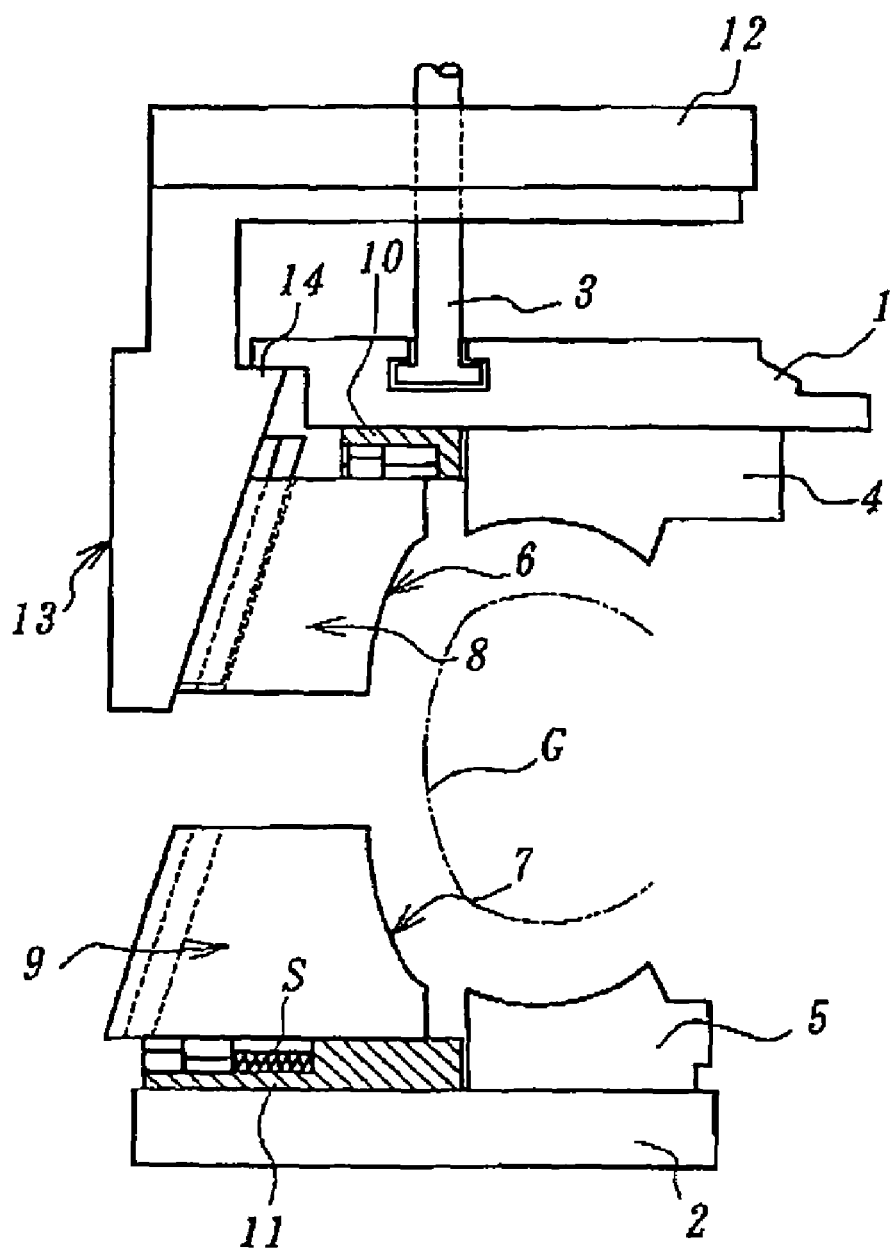
FIG. 5 is a schematic sectional view showing the vulcanizing mold of FIG. 2, wherein the upper segments are vertically moved away from the lower segments.

In this instance, as shown in FIG. 4, the driven surfaces 8a of the upper segments 8 are formed with T-shaped grooves 8b which extend in the vertical direction along the entire height of the segments 8. The cam ring 13 is provided with projections 13b which are precisely fitted in the T-shaped grooves 8b, respectively, so as to engage the cam ring 13 with the segments 8. The driven surfaces 9a of the lower segments 9 are also formed with T-shaped grooves having shapes and dimensions corresponding to the T-shaped grooves 8b in the upper segments 8. Thus, as the projections 13b of the cam ring 13 are displaced downwards and upwards, the segments 8, 9 are positively displaced radially inwards and outwards, respectively. The segments 8, 9 can be returned precisely to their outer limit positions, under the engagement with the projections 13b of the respective T-shaped grooves. Furthermore, it is also possible to prevent unintended expansion or contraction of the mold, i.e., unintended radial displacements of the segments 8, 9 since they are in engagement with the projections 13b.

It is noted that the lower segments 9 can be disengaged from the projections 13b depending upon a stroke position of the cam ring 13. Thus, it is preferred that return springs S are provided for urging the segments 9 radially outwards, i.e., toward their outer limit positions, for assuring positive and smooth engagement of the projections 13b into the respective T-shaped grooves in the lower segments 9.

Further, it is important to restrict excessive upward displacement of the cam ring 13 relative to the upper segments 8, thereby to maintain the contact of the cam ring 13 with the segments 8 over sufficient length. Thus, the cam ring 13 is provided with a shoulder 14 which is brought into abutment with the upper base plate 1 to which the segments 8 are attached, at an upper limit position of the cam ring 13 relative to the segments 8.

After the shoulder 14 has been brought into abutment with the upper base plate 1 during the upward displacement of the cam ring 13 as shown FIG. 3, the mold opening process can be continued by further displacing the upper base plate 1 and upper platen 12 upwards in a synchronized manner, under the operation of respective vertical drive means provided independently from each other. Nonetheless, it is also possible to lift the upper base plate 1 through the cam ring 13 by operating the vertical drive means for the upper platen 12 only, while stopping the operation of a cylinder (not shown) forming the vertical drive means for the upper base plate 1. In this case, it is unnecessary to control the upper base plate 1 and upper platen 12 in a synchronized manner.

In order to perform vulcanization of pneumatic tires with the above-mentioned vulcanizing mold according to the present invention, there is arranged a green tire G positioned on a hard core or bladder within a mold which is in a fully opened position. Then, formation of side portions of a green tire G is started by the sidewall mold members 4, 5, when the vertical drive means for the upper platen 12 is operated to displace the upper base plate 1 downwards through the cam ring 13, and thereby displace the sidewall mold member 4 and upper segments 8 downwards, or when the cylinder rod 3 is extended to directly displace the base plate 1 downwards while rendering the cam ring 13 and platen 12 to follow the downward displacement of base plate 1. In this instance, when the upper and lower segments 8, 9 are brought into abutment with each other as shown in FIG. 3, the formation of the tire side portions by means of the sidewall mold members 4, 5 is completed. Thereafter, the platen 12 and cam ring 13 are further displaced downwards while pressing the upper base plate 1 by the cylinder rod 3. As a result, the upper and lower segments 8, 9 are displaced radially inwards, simultaneously and synchronously, due to the contact of the tapered cam surface 13a with the segments 8, 9, so that a desired formation is performed onto the tread portion of the green tire G.

FIG. 2 shows a state where the segments 8, 9 have reached their inner limit positions and the formation of the tread portion has been completed. In this state, the inner peripheral surfaces of the segments 8, 9 abut against the outer peripheral surfaces of the sidewall mold members 4, 5, respectively. In forming the side portions prior to the formation of the tread portion, the rubber material flows mainly in a direction toward the tread portion, because the forming surfaces of the sidewall mold members 4, 5 do not have noticeable unevenness. It is thus possible to effectively prevent undesired flow of the rubber material into a space, if any, between the outer peripheral surfaces of the sidewall mold members 4, 5 and the inner peripheral surfaces of the segments 8, 9. Thus, the rubber material is prevented from biting between the segments 8, 9 and the sidewall mold members 4, 5 at the time of completion of the tread portion.

The green tire G as formed in this way is processed into a product tire, by performing vulcanization of the green tire G under predetermined temperature and pressure conditions a predetermined period of time.

In order to remove the product tire from the mold, the cam ring 13 is firstly elevated while pressing the upper base plate 1 by the cylinder rod 3, to thereby simultaneously displace the segments 8, 9 radially outwards, until the shoulder 14 of the cylinder rod 3 is brought into abutment with the upper base plate 1 as shown in FIG. 3.

In this way, the segments 8, 9 are displaced radially outwards relative to the product tire, and the projections or ridges on the forming surfaces of segments 8, 9 can be smoothly disengaged from recesses in the tread portion. As a result, since the land regions in the tread portion are not applied with shearing forces by the projections or ridges of the segments 8, 9, it is possible to preventing formation of defects such as of nicks or cracks at the land regions.

Furthermore, the upper and lower tread mold members 6, 7 constituted of the respective segments 8, 9 are independent from each other in the vertical direction. Therefore, the tread mold members 6, 7 can be largely separated from each other upon mold opening. The amount of the radial displacement of the segments 8, 9 can be minimized within a limit in which the projections or ridges of the forming surfaces can be fully disengaged from the tread portion. Also in this way, the separation of the tread mold members 6, 7 in a vertical direction can be smoothly performed without interfering with the tread portion, upon removal of the product tire.

The outer dimension of the mold according to the present invention can be significantly reduced as compared to the prior art in which the segments are required to be radially displaced over a relatively longer distance. The reduced radial displacement amount of the segments 8, 9 results in a reduced the stroke amount of the cam ring 13 and thus contributes to reduce the vertical dimension of the mold.

Thereafter, based on the continued upward displacement of the cam ring 13, the upper base plate 1 together with the sidewall mold member 4 and the upper segments 8 is moved upwards to a height where these parts do not hinder the removal of the product tire. The product tire is thus removed from the mold.

The above-mentioned process steps are repeated with respect to further green tires G.

While the present invention has been described above with reference to a preferred embodiment, it has been presented by way of example only, and various changes and/or modifications may be made without departing from the scope of the invention as defined by the appended claims.

We claim:

1. A vulcanizing mold for pneumatic tires, comprising:
    upper and lower base plates;
    upper and lower sidewall mold members for forming tire sidewall portions, said upper and lower sidewall mold members being attached to said upper and lower base plates, respectively;
    upper and lower tread mold members for forming a tire tread portion, said upper and lower tread mold members being attached to said upper and lower base plates, respectively;
    said upper and lower tread mold members being constituted of upper segments and lower segments, respectively, said upper and lower segments being displaceable only radially relative to said upper and lower sidewall mold members, respectively;
    a spring that urges the lower segments radially outwards; and
    a single cam ring in direct engagement with the upper and lower tread mold members, the single cam ring being displaceable independently of approaching displacements of said sidewall mold members toward each other, to thereby simultaneously displace all of said upper and lower segments radially inwards while the single cam ring remains in direct engagement with the upper and lower tread mold members and while said upper and lower segments are in abutment with each other.

2. The vulcanizing mold according to claim 1, wherein said upper and lower segments are indirectly engaged with said upper and lower base plates, respectively, such that they are radially displaceable relative to respective one of said sidewall mold members.

3. The vulcanizing mold according to claim 1, wherein said upper segments are always in engagement with said cam ring on radially inner side thereof.

4. The vulcanizing mold according to claim 1, further comprising abutment means for defining the upper limit position of the cam ring relative to the upper base plate.

5. A vulcanizing method for vulcanizing pneumatic tires with a vulcanizing mold which comprises: (i) upper and lower base plates; (ii) upper and lower sidewall mold members attached to said upper and lower base plates, respectively; and (iii) upper and lower tread mold members attached to said upper and lower base plates, respectively, the upper and lower tread mold members being in direct engagement with a cam ring; (iv) said upper and lower treat mold members being constituted of upper segments and lower segments, respectively, which are radially expanded and contracted relative to the upper and lower sidewall mold members, respectively, the lower segments being urged radially outwards by a spring; said method comprising the steps of:
    displacing said upper and lower sidewall mold members toward each other so that said upper and lower segments are brought into abutment with each other; and
    operating the cam ring while the cam ring remains in direct engagement with the upper and lower tread mold members to simultaneously displace all of said segments radially inwards independently of approaching displacements of said sidewall mold members toward each other and relative to said upper and lower sidewall mold members, with said upper segments in abutment with said lower segments.

* * * * *